C. H. JONES.
SEWING MACHINE.
APPLICATION FILED JULY 10, 1908.
967,930.
Patented Aug. 23, 1910.
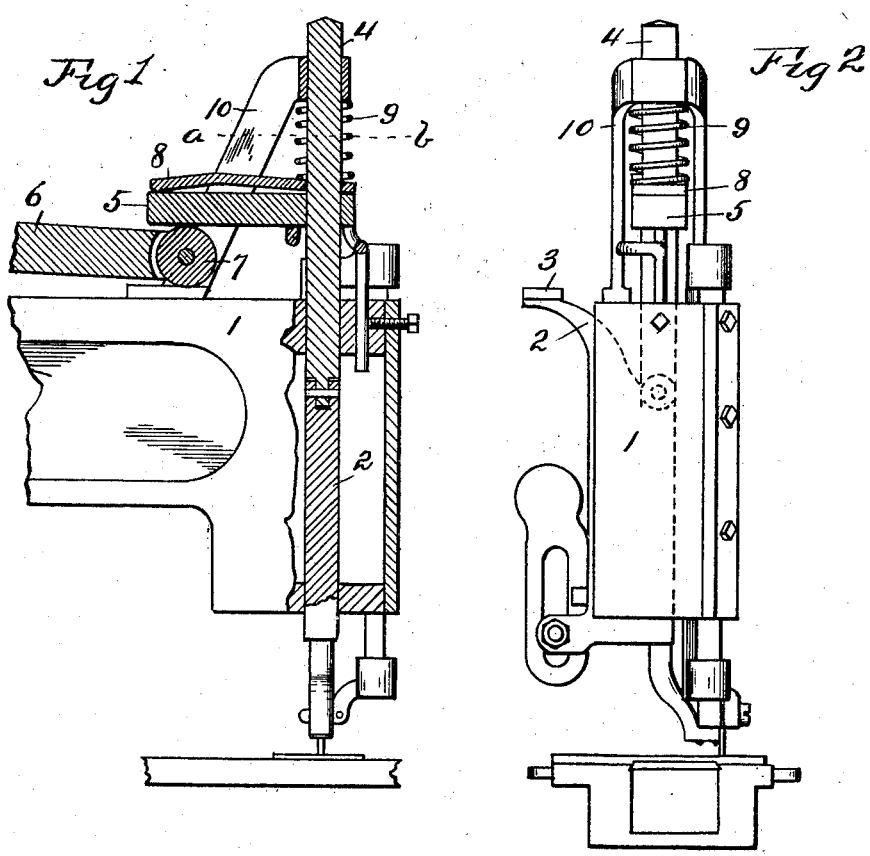
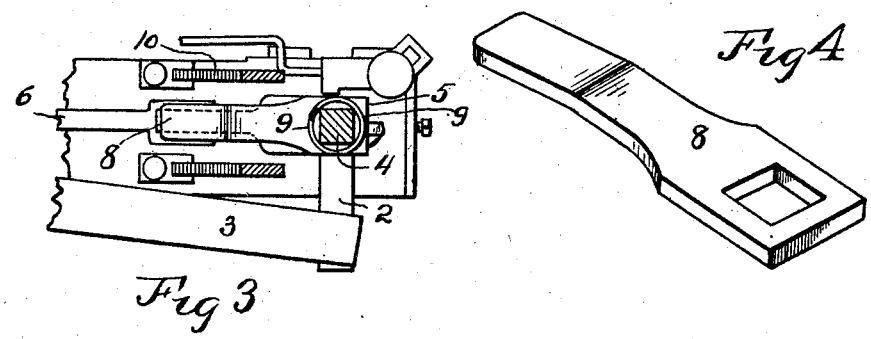
WITNESSES:
INVENTOR.
Charles H. Jones
BY Warren D. House
His ATTORNEY.

UNITED STATES PATENT OFFICE.

CHARLES H. JONES, OF PEABODY, KANSAS.

SEWING-MACHINE.

967,930.

Specification of Letters Patent. Patented Aug. 23, 1910.

Application filed July 10, 1908. Serial No. 442,943.

*To all whom it may concern:*

Be it known that I, CHARLES H. JONES, a citizen of the United States, residing at Peabody, in the county of Marion and State of Kansas, have invented certain new and useful Improvements in Sewing-Machines, of which the following is a specification.

My invention relates to improvements in sewing machines.

My invention is particularly adapted for use on machines employed for sewing leather, and of a type in which the guide bar for the presser foot bar is gripped and lifted by a lifting dog comprising a horizontal plate having a hole through which the guide bar extends, the lifting dog when raised by pressure applied at one side of the guide bar cramping upon and thus gripping the guide bar, a spring being employed for normally forcing the lifting dog downwardly.

In sewing machines of the type referred to, if oil is applied to the guide bar to permit it to slide easily in its bearings, the oil prevents the lifting dog from securely gripping the guide bar. If oil is not used, the guide bar becomes heated and sticks in its bearings. With the employment of my invention oil may be freely applied to the guide bar without interfering with the gripping of the said bar for the purpose of lifting it.

My invention provides a supplemental lifting dog which coöperates with the main lifting dog for raising the guide bar.

The novel features of construction are hereinafter fully described and claimed.

In the accompanying drawings illustrative of my invention, Figure 1 is a view partly in elevation and partly in vertical section of a portion of a sewing machine provided with my improvement. Fig. 2 is a front elevation. Fig. 3 is a horizontal section on the dotted line *a—b* of Fig. 1. Fig. 4 is a perspective view of the supplemental lifting dog.

Similar characters of reference denote similar parts.

1 denotes the head of an ordinary machine used for sewing leather and similar material.

2 denotes the presser foot bar which is normally forced downwardly by a horizontal flat spring 3 secured to the head 1. To the upper end of the presser foot bar 2 is secured the lower end of the vertical guide bar 4 which is vertically slidable in bearings provided in the head 1.

5 denotes a horizontal lifting dog comprising a flat plate having adjacent to one end a vertical hole in which the guide bar is vertically slidable. The hole in the lifting dog 5 is of a size such that when the lifting dog is raised by pressure applied at one side of the guide bar 4 the lifting dog will cramp upon and grip and lift the guide bar.

6 denotes the lifting lever having a friction roller 7 which is adapted to bear against the under side of the lifting dog and raise the said dog when the lever is swung upwardly.

Upon the lifting dog 5 is mounted a supplemental lifting dog comprising preferably a horizontal plate 8 of concavo-convex form, the under side being the concave side. The supplemental lifting dog 8 is provided adjacent to one end with a hole through which the guide bar extends. The size of the said hole is such that when the lifting dog 5 is raised by the roller 7 the supplemental lifting dog 8 will cramp upon and grip the guide bar.

Encircling the guide bar 4 is a coil spring 9 the lower end of which bears upon the upper side of the lifting dog 8, the upper end of the spring bearing against the bifurcated or inverted U shaped plate 10, which is supported upon the head 1 and is provided with a vertical hole in which the guide bar 4 is slidable.

In the operation of my invention, when the lever 6 is upwardly swung the roller 7 will lift the plate 5 and the plate 8 and cause them to cramp and tightly grip and lift the guide bar 4. When the lever 6 swings downwardly the spring 3 will force the presser foot bar 2 and the guide bar 4 downwardly. The plates or lifting dogs 5 and 8 will be forced downwardly by the spring 9 until the lower lifting dog strikes the roller 7, at which time the lifting dogs will be in position to again grip the guide bar.

By the use of the supplemental lifting dog 8 oil may be freely applied to the guide bar 4 to permit its easy movement without causing the lifting dogs to slip on the guide bar when said dogs are raised by the roller 7.

Modifications of my invention, within the scope of the appended claims, may be made without departing from its spirit.

Having thus described my invention, what

I claim and desire to secure by Letters Patent, is:—

1. In a sewing machine, the combination with a vertically movable presser foot bar, of means for normally forcing the said bar downwardly, a vertically slidable guide bar for lifting the presser foot bar, a lifting dog having means when lifted for gripping the guide bar and lifting the same, means for lifting said lifting dog, a supplemental lifting dog supported by the lifting dog and having means for gripping the guide bar when the lifting dog is lifted as described, and means for normally forcing said lifting dogs downwardly.

2. In a sewing machine, the combination with a vertically movable presser foot bar, of yielding means for normally forcing said bar downwardly, a vertically movable guide bar for lifting the presser foot bar, a lifting dog having means when lifted for gripping and lifting the guide bar, means for lifting said lifting dog, a supplemental lifting dog comprising a concavo-convex plate supported upon the lifting dog with its concave side adjacent thereto and having a hole in which the guide bar is slidable, said hole in the supplemental lifting dog being of a size such that when the supplemental lifting dog is lifted by the raising of the lifting dog, the supplemental lifting dog will grip the guide bar, and yielding means for normally forcing said lifting dogs downwardly.

In testimony whereof I have signed my name to this specification in presence of two subscribing witnesses.

CHARLES H. JONES.

Witnesses:
ELZA. RUSSELL,
J. C. SLAYMAKER.